Nov. 23, 1943. H. NERWIN 2,334,883
SUNSHADE
Original Filed March 9, 1939

Inventor:
Hubert Nerwin
By:
Singer, Ehlert, Stern & Carlberg
Attys.

Patented Nov. 23, 1943

2,334,883

UNITED STATES PATENT OFFICE 2,334,883

SUNSHADE

Hubert Nerwin, Dresden-Reick, Germany; vested in the Alien Property Custodian

Original application March 9, 1939, Serial No. 260,738. Divided and this application June 23, 1941, Serial No. 399,283. In Germany May 9, 1938

3 Claims. (Cl. 88—1)

This invention relates to improvements in sunshades for the lenses of photographic and motion picture cameras, and is a division of my United States patent application Serial No. 260,738, filed March 9, 1939, now Patent 2,268,341, issued December 30, 1941.

Sunshades of this type consist usually of a tubular member which is removably attached to the lens mount or on the front wall of the camera casing. When the camera has been used and is to be folded together or packed away in its carrying case it is necessary to remove the sunshade from the camera.

It is the principal object of the invention to provide a sunshade which need not be removed from the camera when the same is to be folded together or packed away. According to the invention the sunshade is provided with a telescopic tubular member of such a size that it may be moved from its extended operative position axially rearwardly over the lens mount, so that it surrounds the lens mount in its inoperative position.

Another object of the invention is to provide the sunshade with a supporting member adapted to be secured to the front end of the lens mount and on which the tubular member is adjustably secured so as to be supported by said member in operative and inoperative position.

Another object of the invention is to provide an adjustable sunshade whose projection beyond the lens is adjustable in accordance with the setting of the variable diaphragm of the lens.

Other objects of the invention will become apparent from the following description with reference to the accompanying drawing which illustrates a few embodiment of the invention.

Figure 1:
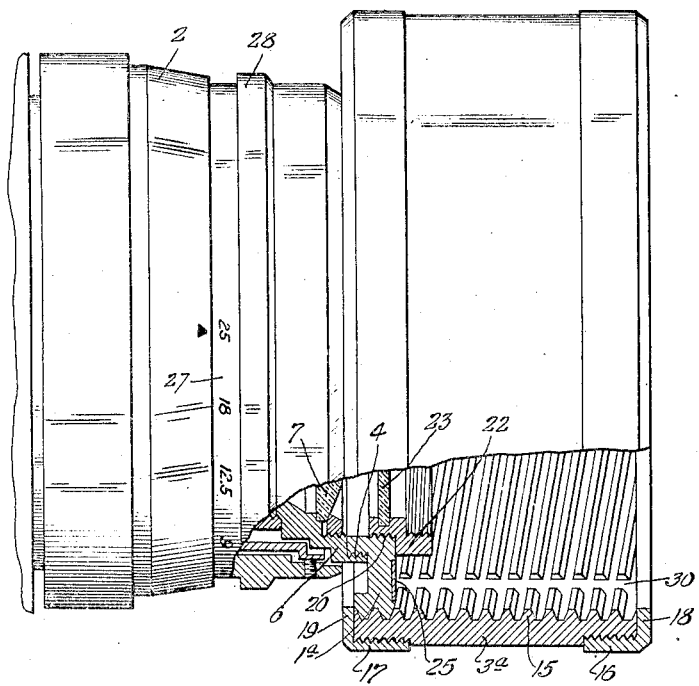
Figure 1 is an elevation view, partly in section of a photographic objective provided with a sunshade, in extended or operative position.

Referring to Fig. 1, the sunshade comprises a supporting ring 1ª adapted to be secured to the lens mount 2, and a tubular member 3ª, which is adjustably secured to the outer circumference of the supporting ring 1ª.

The supporting ring 1ª has an annular flange 4 projecting from its inner circumference and provided with an exterior thread adapted to screw into a corresponding interior thread provided at the front end of the mounting ring 6 for the front lens 7 of the photographic objective.

Figure 2:
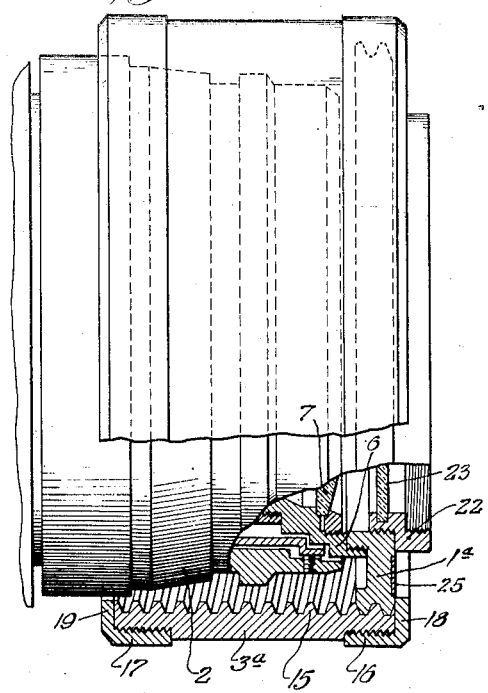
Figure 2 illustrates the sunshade in its inoperative position on the photographic objective.

A tubular member 3ª is connected with the outer circumference of the supporting ring 1ª by means of a thread 15. Preferably a multiplex thread 15 having a high pitch is employed, so that the tubular shade member 3ª can be moved by a relatively short rotative movement from its extended operative position, illustrated in Fig. 1 to its retracted inoperative position illustrated in Fig. 2.

The ends of the tubular member 3ª have rings 16 and 17 respectively attached thereto, each of which is provided with an inwardly extended flange 18 and 19 respectively, which form stops for limiting the axial movement of the tubular member 3ª with respect to the supporting ring 1ª.

In order to adapt the sunshade for the attachment of a color filter or polarizing filter, the supporting ring 1ª is provided with an interior thread 20 for receiving an exteriorly threaded mounting ring 22 in which a filter 23 is secured.

It is also possible to provide the light filter with a mounting ring which is clamped between the outer end of the tubular member 3ª and the flange 18 of the ring 16, in which cases the ring 16 holds the mounting ring in position.

When the aperture of the lens diaphragm is reduced then the conical light beam of the objective is also reduced with respect to a point located at a predetermined distance from the picture plane. Therefore, a sunshade having a certain diameter and a certain axial length would be absolutely correct only for a predetermined aperture of the lens diaphragm. It appears obvious, that if the sunshade is correctly dimensioned for the full aperture of the lens system, that the axial length of the sunshade could be longer when the aperture of the lens diaphragm is reduced.

Figure 3:
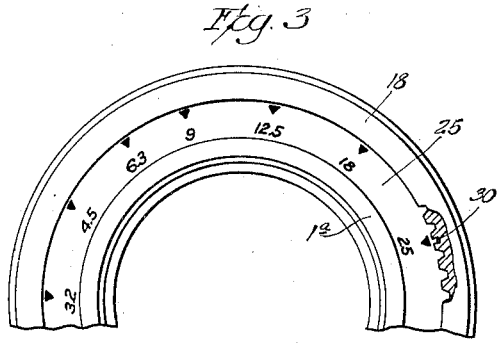
Figure 3 is a front view of the sunshade illustrated in Fig. 1 with a portion broken away.

The present invention lends itself admirably for adjusting the axially movable shade-forming tubular member 3ª in accordance with the setting of the diaphragm aperture, so that the front end of the sunshade can be adjusted to such a position that it just permits the passage of the conical light beam. In order to adjust the extension of the sunshade in accordance with the setting of the lens diaphragm the outer end face of the supporting ring 1ª is provided with a diaphragm scale 25 (Fig. 3) and the rotatable tubular member 3ª is provided with an index which may be brought opposite any scale division of the scale 25. When the lens diaphragm is adjusted to a certain aperture, which is indicated by the diaphragm scale 27 on the diaphragm adjusting ring 28 of the lens mount 2, the sunshade may be adjusted to its most favorable position by rotating the tubular member 3ᵃ until its index, formed in the present instance by an axial groove 30 on the inner wall of the tubular member 3ᵃ, is brought opposite a similar scale division of the scale 25 on the supporting ring 1ᵃ.

What I claim as my invention is:

1. A sunshade for a photographic objective, including a tubular member provided at its inner wall with a thread, a supporting ring adapted to be attached to the mount of the photographic objective and having an exterior thread meshing with said interior thread of said tubular member, whereby upon rotation of said tubular member the same is axially displaced relatively to said supporting ring, said tubular member being thus adapted to be adjusted into an extended operative position and into a retracted inoperative position, in said inoperative position said tubular member surrounding the photographic objective mount to which said supporting ring is attached, and an inwardly extending flange on each end of said tubular member for arresting the combined rotative and axial movement of the same by engaging either end face of said supporting ring when the tubular member reaches either its extended or retracted position.

2. In combination with a photographic objective having a lens mount provided with a manually rotatable diaphragm adjusting ring, an axially adjustable sunshade, including a tubular member provided at its inner wall with a thread, a supporting ring detachably attached to said lens mount and having an exterior thread meshing with said interior thread of said tubular member, whereby upon rotation of said tubular member, the same is axially displaced relatively to said supporting ring and said lens mount, said tubular member being thus adapted to be adjusted into an extended operative position and into a retracted inoperative position, in said inoperative position said tubular member surrounding the lens mount to which said supporting ring is attached, a diaphragm scale on said supporting ring, and means on said tubular member forming an index cooperating with said diaphragm scale, whereby upon rotation of said tubular member said index indicating at any one instant the lens diaphragm aperture for which the sunshade has been adjusted.

3. In combination with a photographic objective having a lens mount provided with a manually rotatable diaphragm adjusting ring, an axially adjustable sunshade, including a tubular member provided at its inner wall with a thread, a supporting ring detachably attached to said lens mount and having an exterior thread meshing with said interior thread of said tubular member, whereby upon rotation of said tubular member the same is axially displaced relatively to said supporting ring and said lens mount, said tubular member being thus adapted to be adjusted into an extended operative position and into a retracted inoperative position, in said inoperative position said tubular member surrounding the lens mount to which said supporting ring is attached, a diaphragm scale on the outer end face of said supporting ring, and an axial groove on the inner wall of said tubular member, said axial groove forming an index cooperating with said diaphragm scale for indicating at any one instant the lens diaphragm aperture for which the sunshade has been adjusted.

HUBERT NERWIN.